(12) United States Patent
Bednarz et al.

(10) Patent No.: US 7,972,739 B2
(45) Date of Patent: Jul. 5, 2011

(54) METHOD FOR INERTING THE ANODES OF FUEL CELLS

(75) Inventors: Marc Bednarz, Taufkirchen (DE); Michael Woski, Neubiberg (DE)

(73) Assignee: MTU CFC Solutions GmbH, Ottobrunn (DE)

( * ) Notice: Subject to any disclaimer, the term of this patent is extended or adjusted under 35 U.S.C. 154(b) by 1496 days.

(21) Appl. No.: 10/506,386

(22) PCT Filed: Feb. 25, 2003

(86) PCT No.: PCT/EP03/01888
§ 371 (c)(1), (2), (4) Date: Sep. 2, 2004

(87) PCT Pub. No.: WO03/075381
PCT Pub. Date: Sep. 12, 2003

(65) Prior Publication Data
US 2005/0095469 A1 May 5, 2005

(51) Int. Cl.
*H01M 8/04* (2006.01)
*H01M 8/14* (2006.01)
(52) U.S. Cl. .................. 429/450; 429/472
(58) Field of Classification Search ........... 429/450, 429/472
See application file for complete search history.

(56) References Cited

U.S. PATENT DOCUMENTS

| 3,544,374 A | * | 12/1970 | Alessandro et. al. | 429/16 |
| 5,492,777 A | * | 2/1996 | Isenberg et al. | 429/17 |
| 6,127,057 A | | 10/2000 | Gorman | |

FOREIGN PATENT DOCUMENTS

| DE | 42 36 441 | 5/1994 |
| DE | 19622693 | 5/1997 |
| EP | 1 263 071 | 12/2002 |
| JP | 63298974 | 12/1988 |
| JP | 04004570 | 1/1992 |
| JP | 4324253 | 11/1992 |
| JP | 2000 277137 | 10/2000 |
| WO | WO 01/15247 | 3/2001 |
| WO | WO 02/19446 | 3/2002 |

OTHER PUBLICATIONS

EG&G Services, Fuel Cell Handbook, Oct. 2000, US Department of Energy, Fifth Edition, p. 2-2.*

* cited by examiner

*Primary Examiner* — Gregg Cantelmo
*Assistant Examiner* — Eugenia Wang
(74) *Attorney, Agent, or Firm* — Lucas & Mercanti, LLP; Klaus P. Stoffel

(57) ABSTRACT

A method for inerting and protecting the anodes of fuel cells, especially high-temperature fuel cells, and a fuel cell system, in which, during a shutdown, when the supply of fuel gas to the anodes is interrupted, during emergency shutdown or standby operation, water vapor is supplied to the anodes, and an external voltage is applied to the fuel cells to produce a reducing atmosphere at the anodes by electrolysis. This makes it possible to inert the anodes of the fuel cells without having to maintain a supply of a flushing or protective gas expressly for this purpose.

4 Claims, 1 Drawing Sheet

METHOD FOR INERTING THE ANODES OF FUEL CELLS

PRIORITY CLAIM

This is a U.S. national stage of application No. PCT/EP03/001888, filed on Feb. 25, 2003. Priority is claimed on that application and on the following application:
Country: Germany, Application No. 102 09 309.1, Filed: Mar. 2, 2002.

BACKGROUND OF THE INVENTION

The invention concerns a method for inerting the anodes of fuel cells, especially high-temperature fuel cells. In addition, the invention concerns a fuel cell system, especially a high-temperature fuel cell system, with one or more fuel cells, each of which has an anode and a cathode, and with an anode inlet for supplying an anode gas to the anodes.

Fuel cells, including, for example, molten carbonate fuel cells, have the problem that when normal operation is interrupted, e.g., during an emergency shutdown or standby operation, when no fuel gas is being supplied to the anodes, the anodes must be quickly inerted (i.e. rendered inert) to prevent them from being damaged or destroyed by oxidation. This is especially true for high-temperature fuel cells with an operating temperature of 200° C. or more. In previously known systems, it is customary to use a flushing or protective gas, which is typically nitrogen. Due to the amounts of gas that are required, it is necessary to provide a nitrogen tank specifically for this purpose, which results in additional space requirement and expense. Furthermore, the permissible shutdown time is limited by the stored supply of flushing gas.

Japanese Patent Abstract 04004570 A describes a fuel cell system, in which a standby gas that contains mainly hydrogen is used to overcome shutdown times of the fuel cell system while maintaining the operating temperature of the fuel cells. This gas is produced in a reformer by supplying the unit with the fuel gas in a smaller amount than for normal operation. At the same time, another gas, which contains carbon dioxide and hydrogen, is supplied to the cathodes at a corresponding flow rate to produce electric energy for powering a heating unit. Moreover, Japanese Patent Abstract 04324253 A describes a fuel cell system that uses a standby gas that consists of a reducing gas mixed with nitrogen to prevent oxidation of the anodes during periods when the fuel cell system is shut down.

U.S. Pat. No. 6,127,057 describes a fuel cell system in which the anode and cathode gas flow fields are flooded with cooling water, which is used as a protective fluid in place of a protective gas.

DE 40 27 655 C1 describes a method for operating an $H_2/O_2/H_2O$ fuel cell in which it is possible to change between a fuel cell mode of operation and an electrolysis mode of operation. During the change of the mode of operation, the cells are flushed with a stream of inert gas. This is intended to ensure that no residual gases from a preceding cycle are present in the cell.

JP 2000-277137 A describes a method in which a flushing gas that consists of carbon dioxide and nitrogen is produced by oxidation of a fuel. Therefore, it is unnecessary to store a separate supply of a standby gas. However, this method has the disadvantage of considerable additional equipment expense for producing the protective gas.

SUMMARY OF THE INVENTION

The objective of the invention is to specify provide a method for inerting the anodes of fuel cells in which a standby gas does not have to be specially supplied and in which there is little or no additional equipment expense. A further objective of the invention is to create a fuel cell system in which inerting of the anodes is possible without the need to store a special supply of standby gas and without additional equipment expense.

The invention creates a method for inerting the anodes of fuel cells, including especially molten carbonate fuel cells. In accordance with the invention, water vapor is supplied to the anodes of the fuel cells, and an external voltage is applied to the anodes to produce a reducing atmosphere at the anodes by electrolysis. This means that an external voltage is applied in such a way that during protective operation, a current flows in the opposite direction compared to normal operation.

An advantage of the method of the invention is that the fuel cell anodes can be inerted without having to provide a flushing gas or protective gas specifically for this purpose. Another advantage is that the shutdown time that can be spanned is not limited by a stored supply of flushing gas. There is no special equipment expense, because the equipment already present can be used. Finally, the method of the invention allows active protection of the fuel cell anodes.

The carbon dioxide necessary for the reaction in the anode half-cell enters the anode half-cell by diffusion from the cathode half-cell, in which air is present. However, in accordance with a preferred refinement of the method of the invention, provision can be made to supply the anodes with $CO_2$ in addition to the water vapor. This has the advantage that the additional supply of small amounts of $CO_2$ provides an even better guarantee of protection of the fuel cell electrolyte from dissolution during the fuel cell shutdown.

In accordance with another advantageous refinement of the method of the invention, mainly $CO_2$ is initially supplied to effect immediate inerting of the anodes, and then the amount of $CO_2$ supplied is reduced with increasing supply of water vapor. This guarantees immediate protection of the anodes until a sufficient amount of water vapor is available.

In addition, the invention creates a fuel cell system, including especially a molten carbonate fuel cell system, with one or more fuel cells, each of which has an anode and a cathode, and with an anode inlet for supplying an anode gas to the anodes. In accordance with the invention, a water vapor generator is provided for supplying the anodes with water vapor to inert the anodes, and the anodes can be connected with an external voltage source to produce a reducing atmosphere at the anodes, so that during protective operation, a current flows in the opposite direction compared to normal operation.

The same advantages that were specified above in connection with the method of the invention also apply to the fuel cell system of the invention.

In accordance with an advantageous refinement of the fuel cell system of the invention, it is provided that $CO_2$ can be supplied to the anodes in addition to the water vapor.

In accordance with another advantageous refinement of the fuel cell system of the invention, it is provided that mainly $CO_2$ can be initially supplied to the anodes to effect immediate inerting of the anodes, and that the amount of $CO_2$ that is supplied is then reduced with increasing supply of water vapor.

It is advantageous for the water vapor generator for supplying the anodes with water vapor to be connected with the anode inlet.

In accordance with an advantageous embodiment of the fuel cell system of the invention, it is provided that the water vapor generator contains a catalyst.

Finally, in accordance with an advantageous refinement of the fuel cell system of the invention, it is provided that the water vapor generator simultaneously serves to produce the $CO_2$ that is additionally supplied to the anodes.

Specific embodiments of the invention are explained below with reference to the drawing.

DETAILED DESCRIPTION OF THE INVENTION

Figure 1:
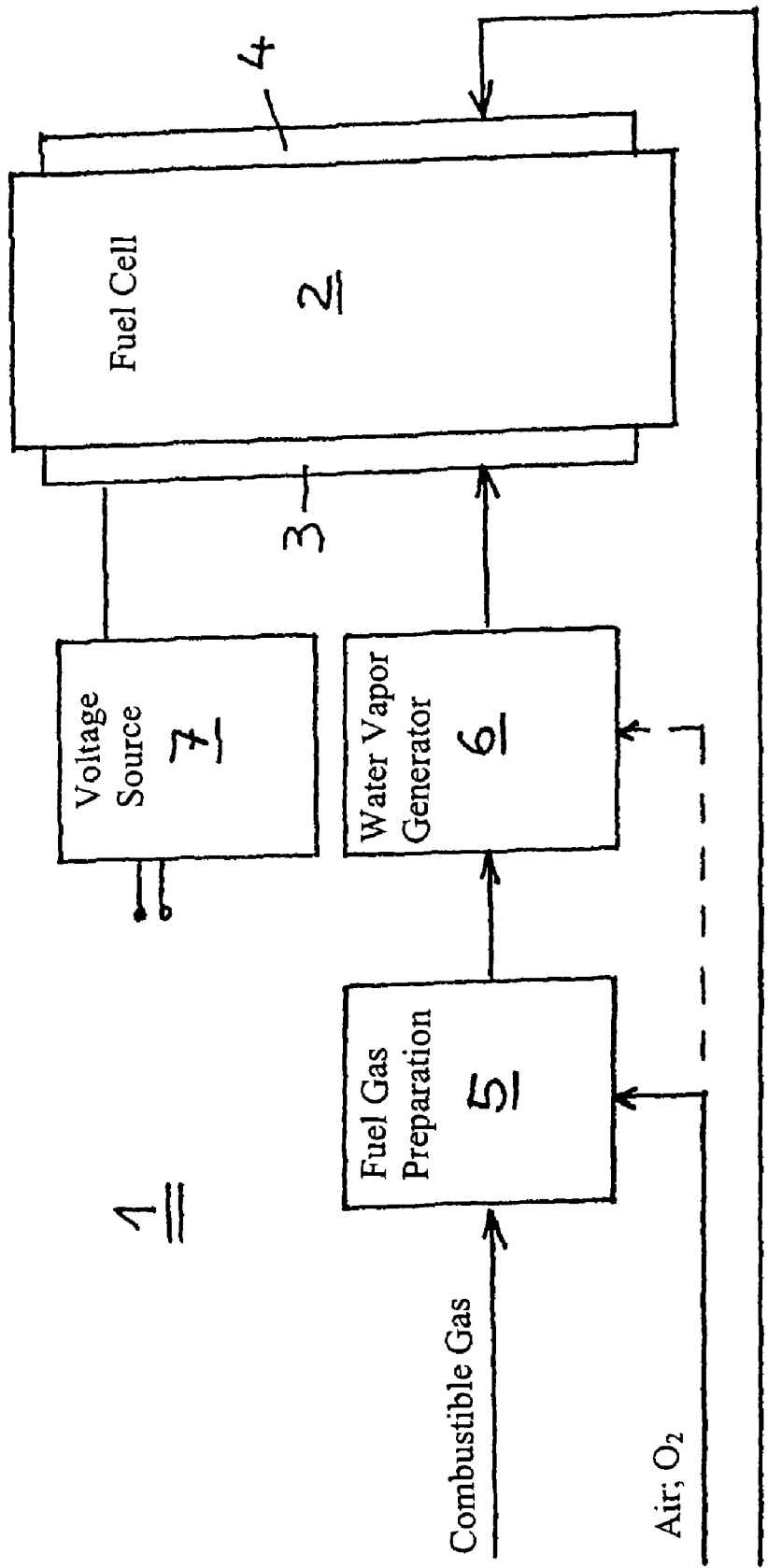
FIG. 1 shows a simplified bock diagram of an embodiment of the fuel cell system of the invention, in which the method of the invention for inerting the anodes of the fuel cells and the fuel cell system of the invention are realized.

A fuel cell system, especially a molten carbonate fuel cell system, which comprises one or more fuel cells 2, is indicated as a whole by reference number 1. Reference number 2 in the drawing indicates a number of fuel cells arranged in the form of a fuel cell stack. Each of the fuel cells 2 contains an anode and a cathode, which are not specifically shown in the drawing, and an electrolyte matrix between the anodes and cathodes, which is also not shown. In addition, the fuel cell system 1 has a fuel gas inlet 3 for supplying an anode gas, specifically, a fuel gas, to the anodes during normal operation, and a cathode outlet 4 for supplying a cathode gas, e.g., air, to the cathodes of the fuel cells 2.

In addition, the fuel cell system 1 contains a system 5, 6 for preparing the anode gas to be supplied to the anode gas inlet. This system comprises a device 5 for preparing the fuel gas and a water vapor generator 6. During normal operation, the system 5, 6 supplies prepared fuel gas for the operation of the fuel cell. During protective operation, when the supply of fuel gas to the anode half-cells is shut off, the system 5, 6 is used to catalytically produce a gas that contains water vapor, which is formed by oxidation of fuel gas when oxygen is supplied. For this purpose, the device 5 for preparing the fuel gas and/or the water vapor generator 6 can contain a catalyst. To the extent that carbon dioxide is also formed, this does not interfere with the method of the invention, since it is needed in the reaction described below. On the other hand, however, it is not necessary to feed carbon dioxide into the anode half-cell through the inlet 3, since carbon dioxide is available in the air present in the cathode half-cell. Carbon dioxide enters the anode half-cell by diffusion. Therefore, it is sufficient to supply only water vapor, which is produced in the water vapor generator 6. Only water is then supplied to the water vapor generator 6, which produces heat for evaporating the water. Water is needed during normal operation for reforming the fuel gas and therefore is also available for the protective operation.

The fuel cell system also contains a voltage source 7 for generating an external voltage, which is applied to the anodes to produce a reducing atmosphere at the anodes by electrolysis.

To inert the anodes of the fuel cells 2 in operating states other than the normal operation of the fuel cell system, i.e., when the fuel gas supply to the anode inlet is interrupted, in emergency shutdown or standby operation, protective operation is started. For this purpose, water vapor is supplied to the anodes of the fuel cells, and a reducing atmosphere is produced at the anodes by electrolysis. The system operates as follows:

Normal Operation

In the cathode half-cell, oxygen and carbon dioxide are supplied with the air, and carbonate ions with a double negative charge are formed ($CO_3^{2-}$). The carbonate ions migrate by diffusion through the matrix and into the anode half-cells, where hydrogen is supplied. The hydrogen reacts with the carbonate ions to form carbon dioxide and water, which results in the release of two electrons per carbonate ion.

Standby Operation (Protective Operation)

In operating states in which no fuel gas is supplied to the anode half-cell, it is necessary to prevent damage of the anode material by oxidation. This is accomplished by applying an external voltage and by supplying the anode half-cell with water vapor, which reacts with the carbon dioxide that is present to form hydrogen and carbonate ions. The carbon dioxide that is required enters the anode half-cell from the cathode half-cell via the electrolyte. At the same time, the carbonate ions with a double negative charge that are formed in the anode half-cell diffuse into the cathode half-cell. The migration of carbon dioxide and carbonate ions is driven by diffusion and is thus based on concentration differences of the gases present in the anode and cathode half-cells. Thus, the reaction that occurs in the anode half-cell in standby operation is just the opposite of the reaction that occurs in standard operation. The absolute requirement for the above-described reaction to start to occur is the application of an external voltage, so that a current flows, specifically, in the opposite direction of current flow from normal operation (electrolysis). The voltage is preferably sufficiently high that a mean current density of 5-10 $mA/cm^2$ is achieved in the opposite direction of flow from normal operation.

To inert the anodes of the fuel cells 2, $CO_2$ can be supplied to the anodes in addition to the water vapor. This $CO_2$ can be produced, especially by catalytic means, together or simultaneously with the water vapor in the water vapor generator 6.

To effect immediate inerting of the anodes, mainly $CO_2$ can be initially supplied to the anodes, and the amount of $CO_2$ that is supplied can then be reduced with increasing supply of water vapor.

The invention claimed is:

1. A method for inerting anodes of fuel cells of a molten carbonate fuel cell system, comprising steps of:
   supplying water vapor to the anodes of the fuel cells during standby operation of the fuel cell in which no fuel gas is supplied to an anode half-cell of the fuel cell; and
   applying an external voltage to the fuel cells to produce a reducing atmosphere at the anodes by electrolysis.

2. The method according the claim 1, and further comprising the step of supplying $CO_2$ to the anodes through a fuel gas inlet in addition to the water vapor.

3. The method in accordance with claim 2, including initially supplying mainly $CO_2$ for effecting immediate inerting of the anodes, and then reducing an amount of $CO_2$ that is supplied with increasing supply of water vapor.

4. The method in accordance with claim 1, and further comprising the step of initially supplying mainly $CO_2$ for effecting immediate inerting of the anodes and subsequently reducing an amount of $CO_2$ being supplied with increasing supply of water vapor.

* * * * *